United States Patent [19]

Suzuki

[11] Patent Number: 4,692,831

[45] Date of Patent: Sep. 8, 1987

[54] DISC CARTRIDGE HAVING POSITIVE ISOLATION MEANS WHEN IN STORAGE

[75] Inventor: Katsuhiro Suzuki, Kanagawa, Japan

[73] Assignee: Sony Corporation, Tokyo, Japan

[21] Appl. No.: 774,583

[22] Filed: Sep. 10, 1985

[30] Foreign Application Priority Data

Sep. 12, 1984 [JP] Japan .................................. 59-191339

[51] Int. Cl.⁴ ........................ G11B 23/02; G11B 19/00
[52] U.S. Cl. ..................................... 360/133; 360/135; 360/97
[58] Field of Search ................. 360/133, 137, 135, 97, 360/99

[56] References Cited

U.S. PATENT DOCUMENTS

| | | | |
|---|---|---|---|
| 4,078,246 | 3/1978 | Berthoux et al. | 360/133 |
| 4,185,308 | 1/1980 | Fujioka | 360/133 |
| 4,458,282 | 7/1984 | Mui et al. | 360/133 |
| 4,459,628 | 7/1984 | Barton | 360/133 |
| 4,571,718 | 2/1986 | Cahill et al. | 360/133 X |
| 4,608,617 | 8/1986 | Oishi et al. | 360/133 |

FOREIGN PATENT DOCUMENTS

51-47330 12/1976 Japan .

Primary Examiner—Stuart N. Hecker
Assistant Examiner—Alyssa H. Bowler
Attorney, Agent, or Firm—Hill, Van Santen, Steadman & Simpson

[57] ABSTRACT

An improved disc cartridge (1) is disclosed, which comprises a case assembly (4) and an information recording disc (5) flatly rotatably housed in the case assembly. A disc holding mechanism is arranged in the disc cartridge in such a manner that when the disc cartridge is not in use, the mechanism holds the disc keeping the same away from the inner periphery of the case assembly, and when the disc cartridge is in use, the mechanism releases the disc completely for free rotation of the same.

26 Claims, 13 Drawing Figures

DISC CARTRIDGE HAVING POSITIVE ISOLATION MEANS WHEN IN STORAGE

BACKGROUND OF THE INVENTION

1. Field of the Invention

The present invention relates to a disc cartridge with a disc, such as a magnetic disc, optical disc, optical-magnetic disc or the like, as recording medium which is rotatably housed in the cartridge casing for recording thereon information by means of a disc player.

2. Description of the Prior Art

Hitherto, various kinds of disc cartridges have been proposed and put into practical use in the field of data recording devices of disc type. The disc cartridge holds therein a data recording disc in such a way that the cartridge can be slipped into a disc player and played with the disc kept therein. Usually, during operation of the disc player, the disc in the cartridge rotates with its upper and lower surfaces kept away from the inner periphery of the cartridge for free rotation thereof. Holding the disc away from the inner periphery has been achieved by a disc drive unit of the disc player. This, on the other hand, means that while not in use, the disc is generally free to move within the cartridge thereby to freely contact or collide with the inner periphery of the cartridge. Collision against the inner periphery may cause damaging the recording surfaces of the disc resulting in "DISC ERROR" which might occur under operation of the disc player. Furthermore, the collision tends to create remarkable noise thereby giving the users uncomfortable feeling.

SUMMARY OF THE INVENTION

Therefore, it is an essential object of the present invention to provide a disc cartridge which can hold the disc within the cartridge when the disc is not in use.

It is more specific object of the present invention to provide a disc cartridge which, when not in use, holds the disc therewithin keeping the same away from the inner periphery of the cartridge and, when in use, releases the disc completely for free rotation by a disc player.

According to the present invention, there is provided a disc cartridge comprising a case assembly and an information recording disc rotatably housed in the case assembly, the disc cartridge being characterized by a disc holding mechanism which is arranged in the case assembly and constructed in such a manner that when the disc cartridge is not in use, the mechanism holds the disc keeping the same away from the inner periphery of the case assembly and when the disc cartridge is in use, the mechanism releases the disc completely for free rotation of the same.

BRIEF DESCRIPTION OF THE DRAWINGS

Other objects and advantages of the present invention will become apparent from the following description when taken in conjunction with the accompanying drawbacks, in which.

DETAILED DESCRIPTION OF THE INVENTION

Referring to the drawings, particularly FIGS. 1A, 1B, 2A and 2B, there is shown a disc cartridge 1 according to the present invention, which contains a disc 5, such as a so-called "draw disc" which can record information thereon in optical or optical-magnetical process. In the illustrated embodiment, the draw disc is of a double sided disc which can record information on both sides thereof.

The disc cartridge 1 has upper and lower cartridge casings 2 and 3 which are constructed of a plastics. These casings 2 and 3 are assembled together by means of fastening screws or the like to form a case assembly 4. The case assembly 4 has a disc containing space formed therein, in which the disc 5 is flatly and rotatably disposed. The disc cartridge 1 containing therein the double-sided disc 5 is thus called as "double-sided disc cartridge" which has A and B sides.

The upper and lower cartridge casings 2 and 3 are formed at their central portions with circular openings 7a and 7b the axes of which are aligned with the axis of a central circular opening 6 of the disc 5 housed in the case assembly 4. As may be best understood from FIG. 10, the upper and lower cartridge casings 2 and 3 are further formed with aligned rectangular openings 8a and 8b respectively, each extending radially outwardly (viz., toward the front side 4a of the case assembly 4) from the corresponding circular opening 7a or 7b. The rectangular openings 8a and 8b allow access of the read/write heads of an associated disc player (not shown) thereinto. As is seen from FIG. 1A, a plurality of ribs 9 are integrally formed on the inner surface of the lower cartridge casing 3 for guiding the periphery 5a of the disc 5. The case assembly 4 is provided at its lateral both sides 4b with respective guide grooves 10a and 10b which, upon insertion of the disc cartridge 1 into the disc player (not shown), engage with corresponding projections 67a and 67b of the disc player to achieve guided movement of the disc cartridge 1 relative to the disc player. At the lateral end portions of the front side 4a of the case assembly 4, there are formed positioning holes 11a and 11b into which, upon final setting of the disc cartridge 1 to the disc player, positioning pins (not shown) of the disc player are inserted to achieve positioning of the disc cartridge 1 relative to the disc player. Furthermore, at the lateral end portions of the rear side 4c of the case assembly 4, there are formed cuts 12a and 12b which are engageable with an automatic cartridge loading/ejecting device (not shown) arranged in the disc player.

A shutter mechanism for selectively opening and closing the rectangular openings 8a and 8b (viz., head accessing openings) will be described hereinnext with reference to FIGS. 1A, 1B, 10 and 11. The mechanism comprises a shutter 14 which is constructed of stainless steel, rigid plastics or the like. As is best seen from FIG. 10, the shutter 14 includes identical upper and lower plate portions 15a and 15b the front ends of which are integrally connected to each other through a front wall 16, so that the shutter 14 has a generally U-shaped configuration. The case assembly 4 carries therein near the front side 4a thereof a guide shaft 18 which extends along the front side 4a from one lateral side 4b to the portion where the right sides (as viewed in FIGS. 1A and 1B) of the rectangular openings 8a and 8b are located crossing the rectangular openings 8a and 8b. An arch-like slider 19 constructed of plastics is slidably supported by the guide shaft 18. For this supporting, the slider 19 has, at its pier portions 19a, aligned openings (no numerals) through which the guide shaft 18 passes. The pier portions 19a are projected outwardly from the front side 4a of the case assembly 4. The upper and lower cartridge casings 2 and 3 are formed at their outer side surfaces 2a and 3a with depressed portions 20a and 20b which are aligned.

Figure 10:
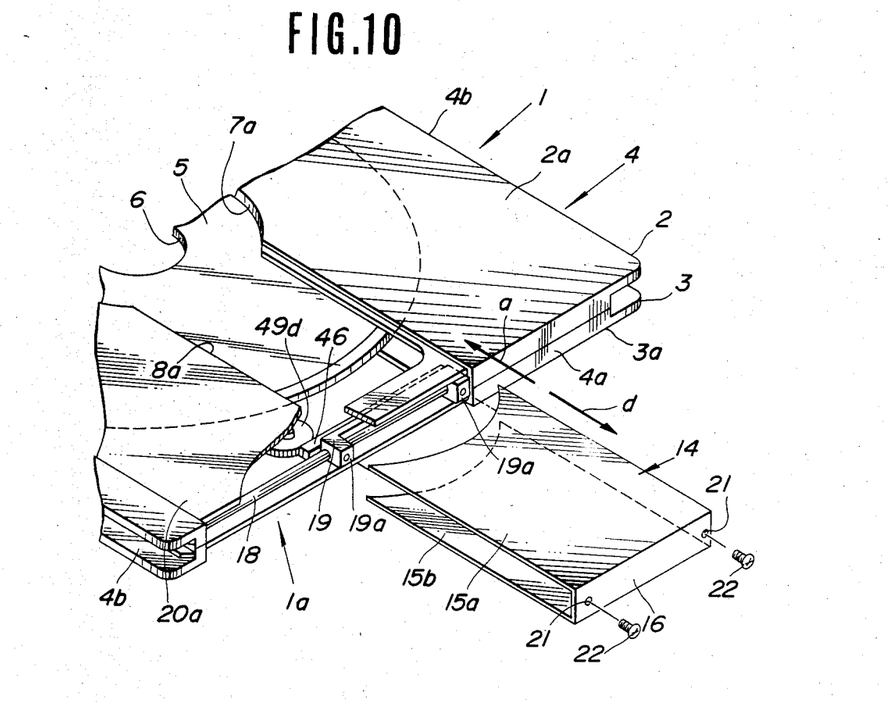
FIG. 10 is a perspective view of the front end of the disc cartridge in a condition wherein a shutter for closing a head accessing opening is disassembled.
Figure 11:
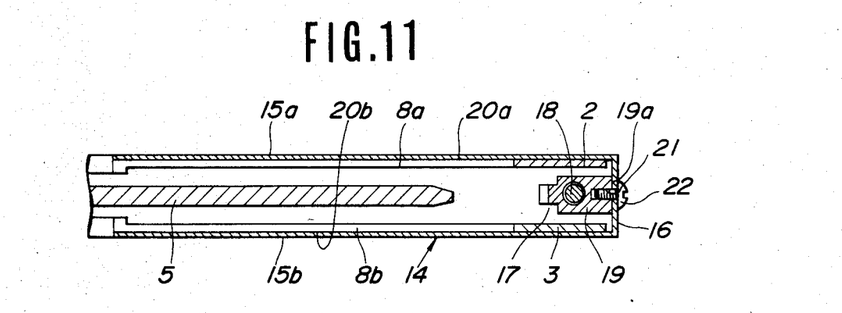
FIG. 11 is an enlarged sectional view taken along the line XI—XI of FIG. 1A.

As is understood from FIG. 10, in assembling the shutter mechanism, the shutter 14 is, at first, mated at its rear open side with the front side 4a of the case assembly 4 and thrusted toward the center of the case assembly 4, that is, in the direction of the arrow "a" sliding the upper and lower plate portions 15a and 15b thereof on the depressed portions 20a and 20b. With this, the shutter 14 comes to the position where spaced openings 21 formed in the front wall 16 thereof are mated with threaded openings (no numerals) formed in the pier portions 19a of the slider 19. Thereafter, two fastening bolts 22 are engaged with the two groups of the mated openings to fasten the shutter 14 to the slider 19. It is to be noted that in addition to the above-mentioned fastening method, various other known fastening methods can be also used for fixing the front wall 16 of the shutter 14 to the slider 19.

Figure 1A:
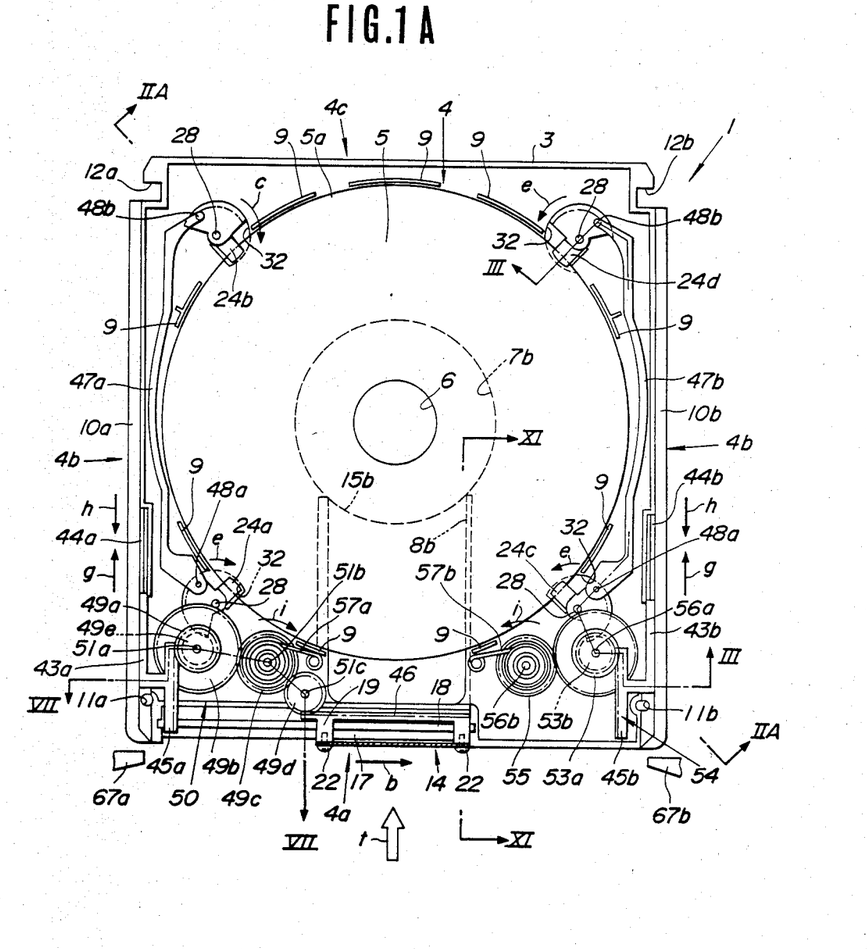
FIG. 1A is a plan view of a disc cartridge according to the present invention in a condition not in use with an upper half of the cartridge removed.
Figure 1B:
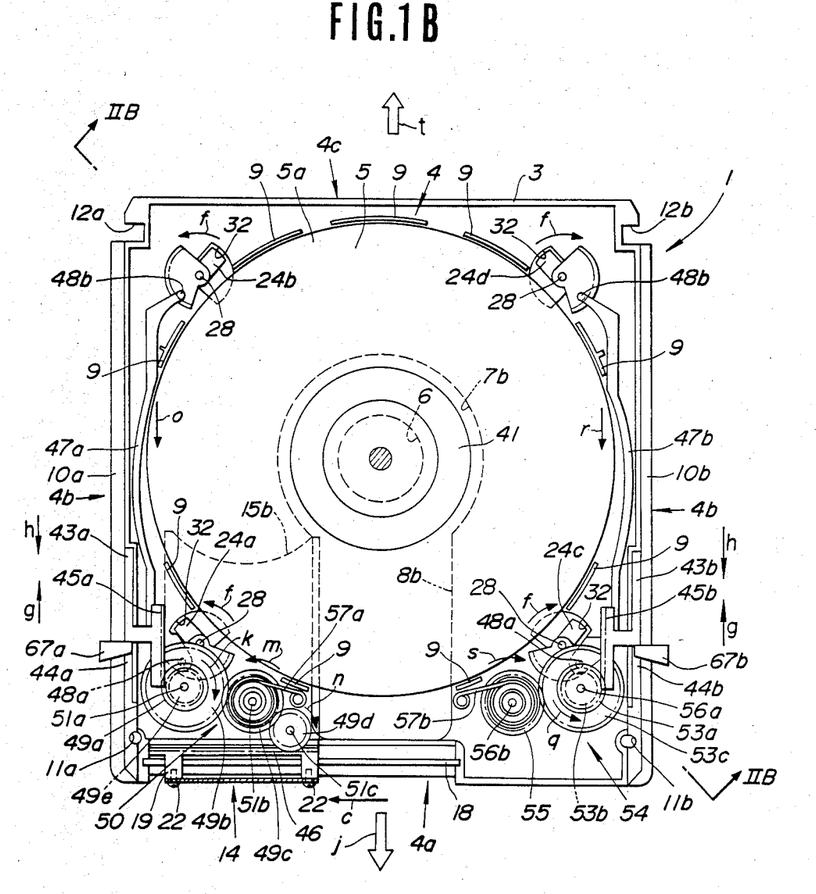
FIG. 1B is a view similar to FIG. 1, but showing the cartridge in a condition in use.

With the shutter mechanism thus assembled, the shutter 14 can slide along the guide shaft 18 between a close position as shown in FIG. 1A wherein the upper and lower plate portions 15a and 15b of the shutter 14 cover the head accessing openings 8a and 8b and an open position as shown in FIG. 1B wherein the upper and lower plate portions 15a and 15b are positioned away from the head accessing openings 8a and 8b to open the same. The arrows "b" and "c" shown in FIGS. 1A and 1B indicate the directions in which the shutter 14 slides for closing and opening the head accessing openings 8a and 8b.

As is understood from the above description, installing the case assembly 4 with the shutter mechanism can be achieved with simple work. Since the fastening bolts 22 are so oriented to extend parallel with the major surface of the case assembly 4, the provision of the bolts 22 has no effect on the thickness of the case assembly 4 thereby bringing about reduction in thickness of the disc cartridge 1. Furthermore, the use of the guide shaft 18 can induce smooth sliding of the shutter 14 between its close and open positions. In addition to these, since the guide shaft 18 is positioned inside of the disc cartridge 1, the external appearance of the cartridge 1 is not deteriorated at all.

In the following a disc supporting mechanism arranged in the case assembly 4 will be described with reference to FIGS. 1A to 6.

As is seen in FIGS. 1A and 1B, the lower cartridge casing 3 is provided at its inside four corners with four disc supporting members 24a, 24b, 24c and 24d, each functioning to support or hold the periphery 5a of the disc 5 housed in the case assembly 4. These members are constructed of suitable plastics and have substantially the same construction except that the two (24a and 24b) of them and the other two (24c and 24d) are each constructed symmetrically. As is understood from FIG. 4 in which the disc supporting member 24d is illustrated, each disc supporting member 24a, 24b, 24c or 24d comprises a generally U-shaped holding portion 25 and a sector gear portion 26 integral with the holding portion 25. Each supporting member is connected to the inside surface of the lower cartridge casing 3 in a manner to be rotatable about an axis perpendicular to the major surface of the case assembly 4. For this rotatable connection, each member is formed at the center of the sector gear portion 26 with a small opening 27 through which a pin 28 extending from the casing 3 passes. As is understood from FIGS. 5 and 6, the disc supporting member 24a, 24b, 24c or 24d is rotatable by an angle ($\theta$) of about 90° between a disc supporting position as illustrated by a solid line wherein the holding portion 25 holds the periphery 5a of the disc 5 and a disc releasing position as illustrated by a phantom line wherein the holding portion 25 is positioned away from the periphery 5a of the disc 5. The arrows "e" and "f" shown in FIGS. 5 and 6 indicate the directions in which the holding portion 25 of the disc supporting member 24a, 24b, 24c or 24d rotates for holding and releasing the disc 5. As is seen from FIGS. 4 and 6, the channel (no numeral) defined between upper and lower walls 25a and 25b of the holding portion 25 is tapered at its front section 29 (that is, the section facing toward the center of the disc 5). Furthermore, as is seen in FIG. 6, the periphery 5a of the disc 5 is also tapered. The tapered surfaces of this periphery 5a are designated by numerals 30 and 30. As is seen from FIGS. 4 to 6, the inside surfaces of the upper and lower cartridge casings 2 and 3 are each formed with four sectorial depressions 31 and 32 to receive the upper and lower walls 25a and 5b of the associated holding portions 25 of the disc supporting members.

As will become clear hereinafter, when the disc cartridge 1 having the above-described disc supporting mechanism is not in use, all the disc supporting members 24a, 24b, 24c and 4d are forced to pivot in the directions of the arrow "e" (see FIG. 1A) to the disc supporting positions wherein as is illustrated by the solid line in FIGS. 5 and 6, the upper and lower walls 25a and 25b of each supporting portion 25 put therebetween the periphery 5a of the disc 5 to hold the same. In this condition, the disc 5 is held in the case assembly 4 keeping a space 33 or 34 between the disc 5 and each of the inner surfaces 2b and 3b of the upper and lower cartridge casings 2 and 3. Thus, when not in use, the disc 5 is safely held in the case assembly 4 without contacting the sensitive recording surfaces of the disc 5 with the inner periphery of the case assembly 4.

Figure 5:
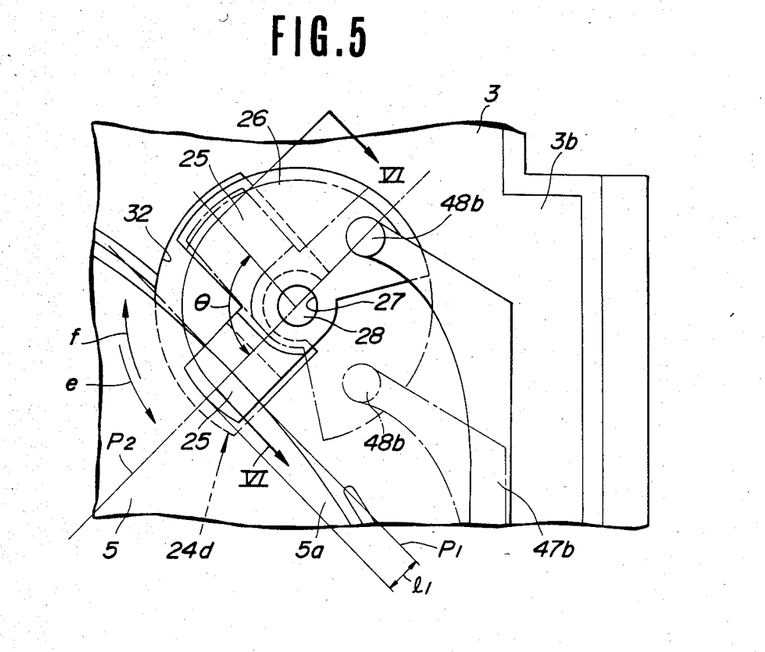
FIG. 5 is a plan view of the essential part of the disc supporting mechanism of FIG. 4.
Figure 6:
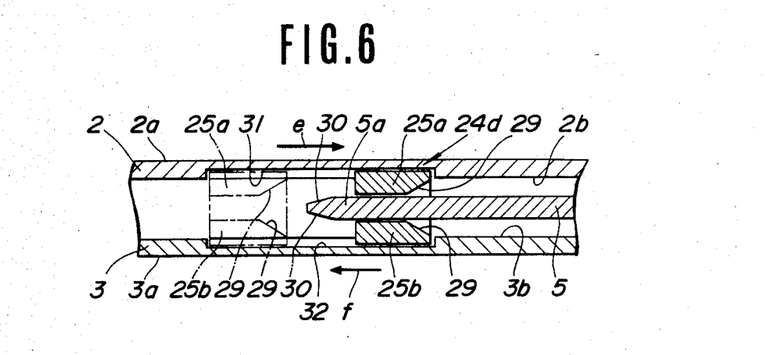
FIG. 6 is a sectional view taken along the line VI—VI of FIG. 5.

When the disc cartridge 1 is in use, that is, when the disc cartridge 1 is inserted or slipped into an associated disc player (not shown), all the supporting members 24a, 24b, 24c and 24d are forced to pivot in the directions of the arrow "f" (see FIG. 1B) to the disc releasing positions wherein, as is illustrated by the phantom line in FIGS. 5 and 6, each disc supporting member 25 is disengaged from the periphery 5a of the disc 5 to release the same. Thereafter, the disc cartridge 1 is finally or properly set in the disc player by the work of cartridge setting members 39 (see FIG. 2B), and then, a turn table 40 and a clamper 41 of the disc player are moved into the circular openings 7b and 7a of the disc cartridge 1 to tightly put therebetween the central portion of the disc 5. After clamping the disc 5, the turn table 40 is rotated by a drive unit of the disc player thereby driving the disc 5 at a given speed. The rotation of the disc 5 is carried out keeping the upper and lower surfaces of the disc 5 away from the inner surfaces 2b and 3b of the upper and lower cartridge casings 2 and 3.

In the following, advantages of the disc supporting mechanism having the above-mentioned construction will be described.

Since the disc holding portion 5 of each supporting member 24a, 24b, 24c or 24d is permitted to describe a curved locus relative to the periphery 5a of the disc 5, the engagement between the disc holding portion 25 and the periphery 5a of the disc 5 can be smoothly achieved. Furthermore, by linking the supporting members 24a, 24b, 24c and 24d through after-mentioned simple links 47a and 47b, the movements of the disc supporting members are synchronized thereby inducting smooth pivotal movements of the same. This linked arrangement also brings about simplification in construction of the disc cartridge 1.

If, as is seen from FIG. 5, each supporting member 24d (24a, 24b or 24c) is so arranged that upon assuming the disc supporting position (as illustrated by a solid line), the longitudinal axis $P_2$ of the holding portion 5 thereof intersects the tangential line $P_1$ of the peripheral edge of the disc 5 at right angles (viz., the axis $P_2$ passes through the center of the disc 5), the disc holding ability of the supporting member is maximized. Furthermore, with this arrangement, even when the rotatable movement of each supporting member 24d between the disc supporting position and the disc releasing position (that is, the movement within the angle $\theta$) is somewhat interrupted, the length $l_1$ of the holding portion 5 which essentially serves to hold the periphery 5a of the disc 5 does not change so severe. Thus, it does not occur that the recording surfaces of the disc 5 are damaged by the holding portion 25.

Since the holding portion 25 is formed, at the front portion of the disc inserting channel, with the tapered surfaces 29, and the peripheral edge of the disc 5 is formed with the tapered surfaces 30 as is mentioned hereinabove, the initial engagement between the holding portion 5 and the disc 5 (that is, the insertion of the periphery 5a of the disc into the channel of the disc holding portion 5) is smoothly and assuredly achieved.

In the following; an actuating mechanism for actuating the afore-mentioned shutter mechanism and disc supporting mechanism will be described with reference to FIGS. 1A to 3 and FIGS. 7 to 9.

Figure 3:
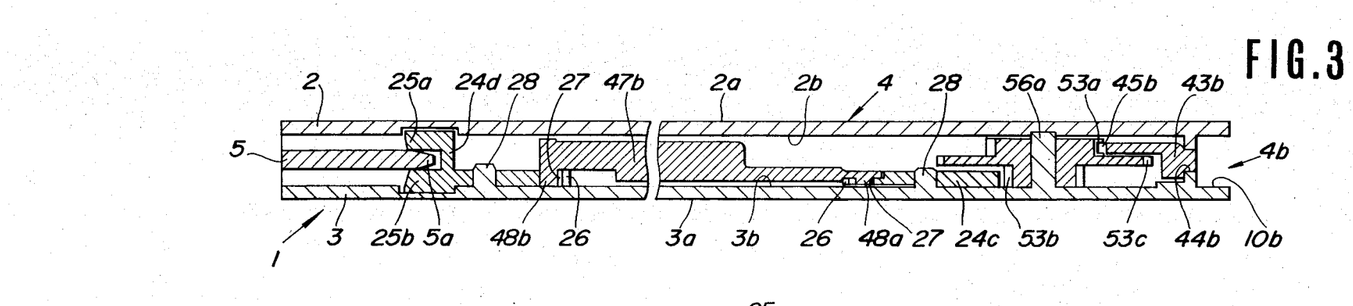
FIG. 3 is a sectional view taken along the line III—III of FIG. 1A.
Figure 4:
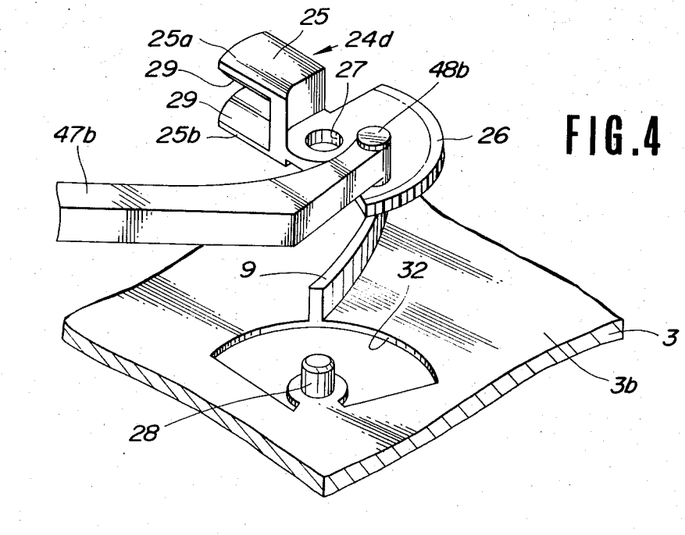
FIG. 4 is an exploded and enlarged perspective view of a portion of the disc cartridge, showing an essential part of a disc supporting mechanism arranged therein.

As is seen from FIGS. 1A, 1B and 3, at the front inside portions of the laterally opposed sides of the case assembly 4, there are respectively arranged sliding members 43a and 43b of suitable plastics each being slidable in the forward and rearward directions (that is, in the directions of the arrows "h" and "g" in FIG. 1A). These sliding members 43a and 43b are arranged to be symmetrical with respect to the accessing axis of the disc cartridge 1. As is seen from FIG. 3, each sliding member 43b or 43a has a projection (no numeral) slidably received in a guide slit 44b or 44a formed in the truck of each guide groove 10b or 10a. Each guide slit 44b or 44a extends from the front portion of the guide groove 10b or 10a to an intermediate portion of the same, so that each sliding member 43b or 43a is slidable forward and earward therebetween. As is seen from FIGS. 1A and 1B, these sliding members 43a and 43b are respectively formed with racks 45a and 45b which are projected into the interior of the case assembly 4. The racks 45a and 45b are arranged parallel with each other. Another rack 46 is fixed to the afore-mentioned slider 19 of the shutter 14. As is seen from FIG. 1A, the disc supporting members 24a and 24b located near the left side of the case assembly 4 are connected through a link 47a, while, the other supporting members 24c and 24d located near the right side of the case assembly 4 are connected through another link 47b. These links 47a and 47b are symmetrical in construction with each other. Each link 47a or 47b has one end pivotally connected through a pin 48a to the sector gear portion 26 of the disc supporting member 24a or 24c and the other end also pivotally connected through a pin 48b to the sector gear portion 26 of the disc supporting member 24b and 24d. With this linked arrangement, the movements of the supporting members 24a and 24b are synchronized, and the movements of the other supporting members 24c and 24d are also synchronized.

Figure 7:
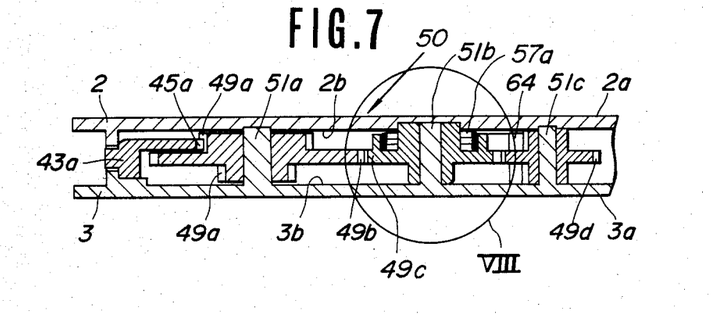
FIG. 7 is a sectional view taken along the line VII—VII of FIG. 1A.

As is seen from FIGS. 1A and 1B, a gear train 50 is arranged which provides a driving connection between the rack 45a of the sliding member 43a and the rack 46 of the shutter 14. The gear train 50 comprises a first gear 49a meshed with the rack 45a of the sliding member 43a, a second gear 49b which is concentrically and integrally connected to the first gear 49a, a third gear 49c meshed with the second gear 49b and a fourth gear 49d meshed with both the third gear 49c and the rack 46 of the shutter 14. These gears 49a (and thus 49b), 49c and 49d are journaled on respective pins 51a, 51b and 1c each extending from the inner surface 3a of the lower cartridge casing 3. As is best shown in FIG. 7, a fifth gear 49e is eccentrically and integrally connected to the first gear 49a, which is meshed with the sector gear portion 26 (see FIG. 1A) of the disc supporting member 24a. The third gear 49c is constructed of plastics and biased in the direction "i" by a coil spring 57a disposed thereabout.

Similar to the above, another gear train 54 is arranged which provides a drive connection between the rack 45b of the sliding member 43b and the disc supporting member 24c. As is seen rom FIGS. 1A, 1B and 3, the gear train 4 comprises a first gear 53a meshed with the rack 45b of the sliding member 43b and a second gear 53b concentrically and integrally connected to the first gear 53a. The second gear 53b is meshed with the sector gear portion 26 of the disc supporting member 24c. The integral first and second gears 53a and 3b are journaled on a pin 56a extending from the inner surface 3a of the lower cartridge casing 3. As is best shown in FIG. 3, a third gear 53c is concentrically and integrally connected to the first gear 53 and meshed with a separate fourth gear 55 which is journaled on a pin 56b extending from the inner surface 3a of the lower cartridge casing 3. The fourth gear 55 is constructed of plastics and biased in the direction of the arrow "i" by a coil spring 57b disposed thereabout. It is to be noted that the monolithic gear construction comprising the first, second and fifth gears 49a, 49b and 49e is identical in construction to the other monilithic gear construction comprising the first, second and third gears 53a, 3b and 53c. It is also to be noted that the gear 55 is identical in configuration to the afore-mentioned third gear 49c.

The biasing mechanism for biasing the gear 49c in the direction of the arrow "i" will be described in detail hereinnext with reference to FIGS. 8 and 9. As the biasing mechanism associated with the gear 55 is substantially the same as that described hereinnext, the description of it will be omitted.

Figure 8:
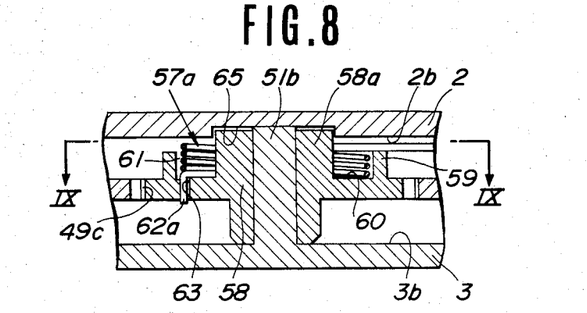
FIG. 8 is an enlarged sectional view of the portion in the circle VIII of FIG. 7.
Figure 9:
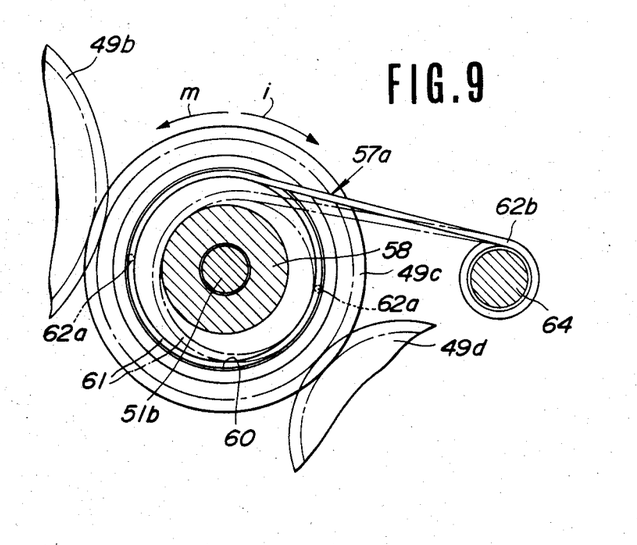
FIG. 9 is an enlarged sectional view taken along the line IX—IX of FIG. 8.

As is understood from FIG. 8, the gear 49c comprises a hub portion 58 rotatably disposed about the pin 5b, an annular flange portion (no numeral) radially outwardly extending from the hub portion 58 and an annular wall portion 59 coaxially disposed on the flange portion to define an annular groove 60 between the hub portion 58 and the annular wall portion 59. The coil spring 57a is coaxially disposed at its multi-turned portion 61 in the annular groove 60. One end 62a of the coil spring 57a is hooked to an opening 63 formed in the flange portion, and the other end 62b of the spring 57a is hooked to a boss 64 formed on the inner surface 3a of the lower cartridge casing 3. The upper portion 58a of the hub portion 58 is rotatably disposed in a circular recess 65 formed in the inner surface 2b of upper cartridge casing 2.

With this arrangement, the gear 49c and thus the gear 55 are biased to rotate in the direction of the arrow "i" in FIG. 1A. The biasing forces produced by the coil springs 57a and 57b permit the above-mentioned two gear trains 50 and 54 to induce a condition wherein the sliding members 43a and 43b are biased in the direction of the arrow "h", the shutter 14 is biased in the direction of the arrow "b" and the disc supporting members 24a and 24c are biased in the direction of the arrow "e". Because of the linked connection between the disc supporting members 24a and 24b, and 24c and 24d, the disc supporting members 24b and 24d are also biased in the direction of the arrow "e".

Accordingly, when the disc cartridge 1 is not in use, it assumes the condition as shown in FIG. 1A wherein the sliding members 43a and 43b are in their forwardmost positions, the shutter 14 is in the close position and the disc supporting members 24a, 24b, 24c and 24d are in the disc holding positions.

As is understood from FIG. 1B, upon requirement of practical use, the disc cartridge 1 is horizontally held and then slipped into an associated disc player (not shown) in the direction of the arrow "j". During this slipping, two projections 67a and 67b arranged in the disc player are put in the guide grooves 10a and 10b of the cartridge 1 having the top portions thereof brought into contact with the forward ends of the sliding members 43a and 43b. Further insertion of the disc cartridge 1 causes the sliding members 43a and 43b to move in the direction of the arrow "g" relative to the case assembly 4 actuating the gear trains 50 and 54 against the forces produced by the coil springs 57a and 57b. That is, the rack 45a of the sliding member 43a rotates the monolithic first and second gears 49a and 49b of the gear train 50 in the direction of the arrow "k" thereby rotating the third and fourth gears 49c and 49d in the directions of the arrows "m" and "n", respectively. With the rotation of the fourth gear 49d, the rack 46 of the shutter 14 is moved along the guide shaft 18 in the direction of the arrow "c" and thus, the shutter 14 comes to the open position as is illustrated by a broken line in FIG. 1B. During this, the rotation of the fifth gear 49e integral with the first and second gears 49a and 49b rotates the disc supporting member 24a in the direction of the arrow "f" drawing the link 47a in the direction of the arrow "o" and thus rotating the other disc supporting member 24b in the direction of the arrow "f". Similar to these movements, the sliding of the rack 45b of the other sliding member 43b rotates the first gear 53a of the gear train 54 in the direction of the arrow "q" permitting the second gear 53b to rotate the disc supporting member 24c in the direction of the arrow "f". With this rotation of the disc supporting member 24c, the link 47b is moved in the direction of the arrow "r" thereby rotating the other disc supporting member 24d in the direction of the arrow "f". With these movements, the four disc supporting members 24a, 24b, 24c and 24d are simultaneously rotated from the disc supporting positions to the disc releasing positions therby releasing the disc 1 in the case assembly 4. During the slipping motion of the disc cartridge 1 into the disc player as mentioned above, the gears 49c and 55 are rotated in the directions of the arrows "m" and "s" to wind the associated coil springs 57a and 57b to store energy.

Figure 2A:
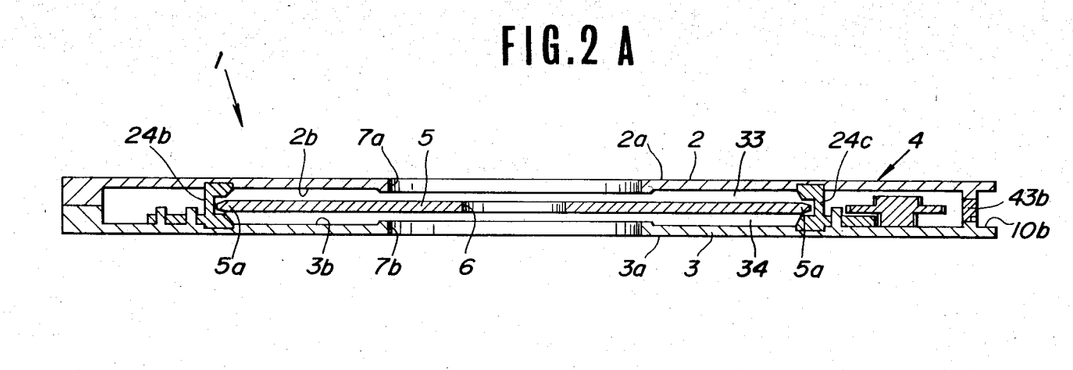
FIG. 2A is a sectional view taken along the line IIA—IIA of FIG. 1A.
Figure 2B:
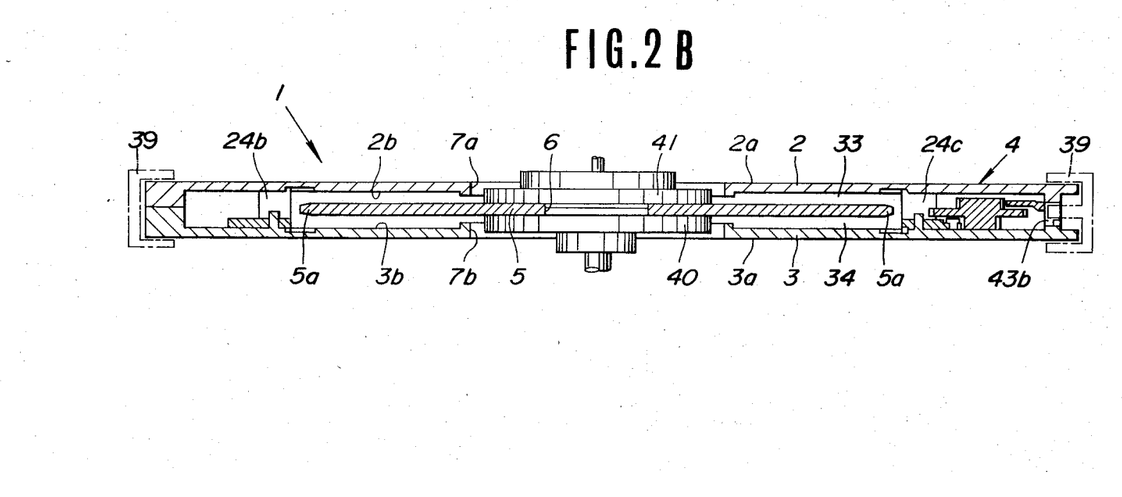
FIG. 2B is a sectional view taken along the line IIB—IIB of FIG. 1B.

Due to the above-mentioned movement, the disc cartridge 1 is finally and properly set in a predetermined fixed position as shown by FIG. 2B wherein the cartridge 1 is tightly held by the cartridge setting members 39. Thereafter, the turn table 40 and the clamper 41 are moved to clamp the disc 5 which has been released from the disc supporting members 24a, 24b, 24c and 24d and a known read/write head (not shown) of the disc player is inserted into the head accessing opening 8b of the lower cartridge casing 3 to contact the lower surface of the disc 5. Then, the turn table 40 is rotated to drive the disc 5 and the read/write head moves radially inwardly and outwardly in the opening 8b to read or write information on the lower surface of the disc 5.

It will be easily understood to those skilled in the art that if the cartridge insertion is made with the disc cartridge 1 being held upside down, substantially the same movements or operations as those mentioned hereinabove are carried out by the parts of the disc cartridge 1. Thus, in this case, the upper surface of the disc 5 as illustrated in the drawings serves as the recording surface to which the read/write head is applied.

When, upon requirement of dismantling, the disc cartridge 1 is pulled or ejected from the disc player in the direction of the arrow "t" in FIG. 1B, the sliding members 43a and 43b are forced to move in the direction of the arrow "h" due to the work of the energy stored by the springs 57a and 57b. With this movement of the sliding members 43a and 43b, the gear train 50 is actuated to move the shutter 14 to the close position and rotate the disc supporting members 24a and 24b to the disc supporting positions, and at the same time, the other gear train 54 is actuated to rotate the disc supporting members 24c and 24d to the disc supporting positions. Thus, upon completion of dismantling the disc cartridge 1 from the disc player, the parts of the disc cartridge 1 assume the positions as illustrated by solid lines in FIG. 1A.

In the following, features and advantages of the actuating mechanism will be described.

Employment of the gear train 50 and the link 47a enables the two functions (viz., the function to automatically open and close the shutter 14 and the function to automatically hold and release the disc 1) to be effected smoothly at the same time. Employment of the other gear train 54 and the link 47b brings about smooth and synchronous operations of the disc supporting members 24c and 24d. The coil springs 57a and 57b constitute a means for storing energy for driving the shutter 14, the sliding members 43a and 43b and the disc supporting members 24a, 24b, 24c and 24d. This induces simple construction of the actuating mechanism. Since the sliding member 43a and the shutter 14 are connected by means of the gear train 50, the moved distance of the sliding member 43a can be freely selected irrespective of that of the shutter 14. This makes it possible to control the sliding speed of the sliding member 43a to a considerably low level as compared with that of the shutter 14. Thus, designing and producing the actuating mechanism can be made with ease. Since the sliding members 43a and 43b incorporated with the parts arranged in the disc cartridge 1 are arranged symmetrically, switching the recording surface of the disc 5 can be carried out by only turning the disc cartridge 1 upside down prior to insertion of the same into the disc player. Furthermore, as will be understood from FIG. 8, since each coil spring 57a (or 57b) is snugly disposed within the annular groove 60 defined on the third gear 49c (or gear 55) of the gear train 50 (or 54), it does not occur that during operation of the gear train, the spring is disengaged from the gear 49c (55). Furthermore, disposing the coil spring about the cylindrical hub portion 58 of the gear 49c (or 55) induces compact combination therebetween. Furthermore, since the upper portion 58a of the spring-wound gear 49c (or 55) is snugly received in the recess 65 formed in the inner surface 2b of the upper cartridge casing 2, the spring is prevented from having a portion thereof severely put between the top of the gear and the inner surface 2b of the casing 2. Since the coil spring 57a is arranged on the third gear 49c which is distant from either of the rack 45a of the sliding member 43a and the rack 46 of the shutter 14, assembling the spring to the position is easily carried out without suffering interruption of these racks 45a and 46. Furthermore, since the four disc supporting members 24a, 24b, 24c and 24d are parted into two groups each including two members which are synchronously moved by a link 47a or 47b, designing and producing this mechanism are easily achieved with less dimensional errors. Parting the disc supporting members into the two groups is thought out by considering the difficulty of producing a mechanism in which all the four disc supporting members are arranged to move synchronously by four links each connecting adjacent two of the disc supporting members. That is, it has been revealed that making the four disc supporting members move synchronously by the four links causes the product of the disc cartridge to have non-allowable dimensional errors.

Although the above description is directed to only one embodiment illustrated by the appended drawings, the present invention is not limited to it. Various modifications are available without departing from the scope of the claims which define the present invention.

What is claimed is:

1. A disc cartridge for use with a disc player, comprising a case assembly (4) and an information recording disc (5) rotatably housed in said case assembly, which is characterized by a disc holding mechanism which is constructed in such an arrangement that when said disc cartridge is not in use, said disc holding mechanism holds said disc keeping the same away from the inner periphery of said case assembly and when said disc cartridge is in use with said disc player, said disc holding mechanism releases said disc complete for free rotation of the same, a plurality of disc supporting members (24a, 24b, 24c, 24d) arranged in said case assembly, each having both a disc holding position wherein each said disc supporting member contacts and positively holds the periphery (5a) of said disc away from said case assembly and a disc releasing position wherein said disc supporting member releases the disc;

biasing means (57a, 57b) for biasing each of said disc supporting members to assume said disc holding position; and an actutating means (43a, 50), (43b, 54) for forcing each of said disc supporting members to assume said disc releasing position against the force of said biasing means when said disc cartridge is thrusted into said disc player.

2. A disc cartridge as claimed in claim 1, further characterized in that each of said disc supporting members is pivotally connected to said case assembly and thus pivotal between said disc holding position and said disc releasing position.

3. A disc cartridge as claimed in claim 2, further characterized in that said disc supporting members are arranged to move synchronously.

4. A disc cartridge as claimed in claim 3, further characterized in that said actuating means comprises:

a sliding member (43a, 43b) arranged at one lateral side of said case assembly in a manner to be slidable along the lateral side; and a gear train (50, 4) arranged between said sliding member and one of said disc supporting members in such a manner that moving said sliding member in one direction (g) along the lateral side of the case assembly causes said disc supporting members to assume their disc releasing positions while, moving said sliding member in the other direction (h) along the same causes said disc supporting members to assume their disc holding positions.

5. A disc cartridge as claimed in claim 4, further characterized in that one gear (49c, 55) of said gear train is biased, by said biasing means, to rotate in a direction corresponding to the direction in which said disc supporting members are pivoted to hold the periphery of said disc.

6. A disc cartridge as claimed in claim 5, further characterized in that said biasing means comprises a coil spring (57a, 57b) which is disposed about said gear with one end fixed to said case assembly and the other end fixed to said gear.

7. A disc cartridge as claimed in claim 6, further characterized in that said sliding member is provided with a rack (45a, 45b) meshed with one (49a, 53a) of the gears of said gear train.

8. A disc cartridge as claimed in claim 7, further characterized in that each of said disc supporting members comprises:

a disc holding portion (25) which is engageable with the periphery (5a) of said disc to hold the same; and a sector gear portion (26) integral with said disc holding portion and pivotally connected to said case assembly.

9. A disc cartridge as claimed in claim 8, further characterized in that the sector gear portion of one of said disc supporting members is meshed with another one (49e, 53c) of the gears of said gear train.

10. A disc cartridge as claimed in claim 9, further characterized in that said sliding member has a portion which is exposed to the outside of said case assembly, so that upon insertion of the disc cartridge into the disc player, a projection (67a, 67b) of said disc player is brought into contact with said portion and pushes the same moving said sliding member in said one direction relative to said case assembly.

11. A disc cartridge as claimed in claim 3, further characterized in that said disc supporting members are pivotally connected with each other by a link (47a, 47b).

12. A disc cartridge as claimed in claim 2, further characterized in that said disc supporting members are parted into first and second groups each including two of the members (24a, 24b), (24c, 24d) which are synchronously moved.

13. A disc cartridge as claimed in claim 12, further characterized in that said actuating means comprises first and second groups of parts which are incorporated with said first and second groups of the disc supporting members respectively, said first and second groups of parts being positioned at the laterally opposed side portions of the case assembly, each group of parts including a sliding member slidable along a side of said case assembly, and a gear train arranged between said sliding member and one of the disc supporting members of the associated group in such a manner that moving said sliding member in one direction (g) along the side of the case assembly causes said disc supporting members of the associated group to assume their disc releasing positions, while moving said sliding member in the other direction (h) along the same causes said disc supporting members to assume their disc holding positions.

14. A disc cartridge as claimed in claim 13, further characterized in that one gear (49c, 55) of said gear train is biased by said biasing means to rotate in a direction corresponding to the direction in which said disc supporting members are pivoted to hold the periphery of said disc.

15. A disc cartridge as claimed in claim 14, further characterized in that said biasing means is a coil spring (57a, 57b) which is disposed about said gear with one end fixed to said case assembly and the other end fixed to said gear.

16. A disc cartridge as claimed in claim 15, further characterized in that said sliding member is provided with a rack (45a, 45b) meshed with one (49a, 53a) of the gears of said gear train.

17. A disc cartridge as claimed in claim 16, further characterized in that each of said disc supporting members comprises:
 a disc holding portion (25) which is engageable with the periphery of said disc to hold the same; and
 a sector gear portion (26) integral with said disc holding portion and pivotally connected to said case assembly.

18. A disc cartridge as claimed in claim 17, further characterized in that the sector gear portion of one of said disc supporting members is meshed with another one (49e, 53c) of the gears of said gear train.

19. A disc cartridge as claimed in claim 18, further characterized in that said sliding member has a portion which is exposed to the outside of said case assembly, so that upon insertion of said disc cartridge into the disc player, a projection (67a, 67b) of said disc player is brought into contact with said portion and pushes the same moving said sliding member in said one direction relative to said case assembly.

20. A disc cartridge as claimed in claim 19, further characterized in that said disc supporting members of the same group are pivotally connected with each other by a link (47a, 47b).

21. A disc cartridge as claimed in claim 20, further characterized by a shutter mechanism (14) which can selectively open and close an opening (8a, 8b) formed in said case assembly in response to the movement of the sliding member of one of the first and second groups of parts, said opening being an opening into which a read-/write head of the disc player is inserted for reading or writing information on the disc upon setting said disc cartridge to the disc player.

22. A disc cartridge as claimed in claim 21, further characterized in that said shutter mechanism is arranged to open said opening of the case assembly when said sliding member is moved in the direction to cause the disc supporting members to assume the disc releasing positions and close said opening of the case assembly when said sliding member is moved in the other direction to cause the disc supporting members to assume the disc holding positions.

23. A disc cartridge as claimed in claim 22, further characterized in that said shutter mechanism comprises a shutter proper (14) which is sized to cover said opening of the case assembly, guide means for guiding the movement of said shutter proper between an open position wherein said shutter proper opens said opening of the case assembly and a closed position wherein said shutter proper closes said opening of the case assembly, and synchronizing means for synchronizing the movement of said shutter proper with the movement of said sliding member.

24. A disc cartridge as claimed in claim 23, further characterized in that said guide means comprises a guide shaft (18) which extends across the opening of the case assembly, and a slider (19) slidably movable along said guide shaft and connected to said shutter proper (14) to move therewith.

25. A disc cartridge as claimed in claim 24, further characterized in that said synchronizing means comprises a rack (46) secured to said slider and meshed with one (49d) of the gears of said gear train (50).

26. A disc cartridge as claimed in claim 25, further characterized in that each of the sliding members of said first and second groups of parts has a portion which is exposed to the outside of said case assembly, so that upon insertion of the disc cartridge into the disc player, a projection (67a, 67b) of said disc player is brought into contact with said portion and pushes the same moving said sliding member in the direction to cause the disc supporting members to assume the disc releasing positions.

* * * * *